(12) United States Patent
Sun

(10) Patent No.: US 7,792,961 B2
(45) Date of Patent: Sep. 7, 2010

(54) APPARATUS AND COMPUTER-READABLE MEDIA FOR RECOVERABLE WORKFLOW

(75) Inventor: Mingqiu Sun, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 274 days.

(21) Appl. No.: 12/140,599

(22) Filed: Jun. 17, 2008

(65) Prior Publication Data

US 2008/0250145 A1    Oct. 9, 2008

Related U.S. Application Data

(62) Division of application No. 09/876,673, filed on Jun. 7, 2001, now Pat. No. 7,412,520.

(51) Int. Cl.
*G06F 15/173* (2006.01)

(52) U.S. Cl. ............. 709/224; 709/203; 709/227; 718/100

(58) Field of Classification Search ........... 709/203, 709/224, 227; 718/100, 102
See application file for complete search history.

(56) References Cited

U.S. PATENT DOCUMENTS

| | | | |
|---|---|---|---|
| 5,014,192 A | 5/1991 | Mansfield et al. | |
| 5,463,208 A | 10/1995 | Sasou et al. | |
| 5,465,328 A | 11/1995 | Dievendorff et al. | |
| 5,774,661 A | 6/1998 | Chatterjee et al. | |
| 5,832,455 A * | 11/1998 | Hayashi et al. | 705/7 |
| 5,850,518 A | 12/1998 | Northrup | |
| 5,960,404 A | 9/1999 | Chaar et al. | |
| 5,974,392 A | 10/1999 | Endo | |
| 5,999,911 A | 12/1999 | Berg et al. | |
| 6,041,306 A | 3/2000 | Du et al. | |
| 6,055,273 A | 4/2000 | Isomura | |
| 6,289,474 B1 | 9/2001 | Beckerle | |
| 6,442,533 B1 | 8/2002 | Hinkle | |
| 6,442,690 B1 * | 8/2002 | Howard et al. | 713/175 |
| 6,578,159 B1 | 6/2003 | Kitagawa et al. | |
| 6,633,821 B2 | 10/2003 | Jackson et al. | |

(Continued)

OTHER PUBLICATIONS

"U.S. Appl. No. 09/876,645 Response filed May 19, 2008 to Final Office Action mailed Mar. 18, 2008", 15 pgs.

(Continued)

*Primary Examiner*—Salad Abdullahi
*Assistant Examiner*—El Hadji M Sall
(74) *Attorney, Agent, or Firm*—Schwegman, Lundberg & Woessner, P.A.

(57) ABSTRACT

Improved methods for providing recoverable workflow of complex and/or risk-prone workflows in a computer system or computer network include segmenting such workflows into sub-processes, associating a checkpoint with the end of each sub-process, and determining whether processing of each sub-process was successful. If so, a set of parameters is stored at each checkpoint before processing the next sub-process, but otherwise processing of the failed sub-process is retried, using the parameter set stored at the previous checkpoint. In one embodiment, the methods are implemented by a certified messaging capability that guarantees delivery of any message. In the event a hardware or software failure occurs during a sub-process execution, the certified messaging capability returns a failure indication, so that execution of the failed sub-process can be reinitiated. Improved computers and computer networks for providing recoverable workflow are also described.

9 Claims, 5 Drawing Sheets

U.S. PATENT DOCUMENTS

| | | | |
|---|---|---|---|
| 6,651,163 | B1 | 11/2003 | Kranich et al. |
| 6,801,938 | B1 | 10/2004 | Bookman et al. |
| 6,859,462 | B1 | 2/2005 | Mahoney et al. |
| 6,859,823 | B1 | 2/2005 | Nishihara et al. |
| 6,938,240 | B2 | 8/2005 | Charisius et al. |
| 7,010,602 | B2* | 3/2006 | Poindexter et al. .......... 709/226 |
| 7,133,842 | B2* | 11/2006 | Harif ........................... 705/37 |
| 7,412,520 | B2 | 8/2008 | Sun |
| 7,418,475 | B2* | 8/2008 | Stewart et al. .............. 709/204 |
| 7,454,751 | B2 | 11/2008 | Sun et al. |
| 2001/0024497 | A1* | 9/2001 | Campbell et al. ...... 379/265.09 |
| 2001/0027477 | A1* | 10/2001 | Nakamura et al. .......... 709/206 |
| 2001/0056492 | A1* | 12/2001 | Bressoud et al. ............ 709/227 |
| 2002/0052771 | A1* | 5/2002 | Bacon et al. .................... 705/8 |
| 2002/0065701 | A1* | 5/2002 | Kim et al. ....................... 705/9 |
| 2002/0087881 | A1* | 7/2002 | Harif .......................... 713/201 |
| 2002/0112008 | A1* | 8/2002 | Christenson et al. ........ 709/206 |
| 2002/0138321 | A1 | 9/2002 | Yuan et al. |
| 2003/0101211 | A1* | 5/2003 | Northrup .................... 709/203 |
| 2005/0235061 | A1 | 10/2005 | Debber et al. |
| 2006/0167735 | A1 | 7/2006 | Ward |

OTHER PUBLICATIONS

"U.S. Appl. No. 09/876,645 Response filed Jan. 16, 2008 in respoonse to Non-Final Office Action mailed Nov. 16, 2007", 14 pgs.

"U.S. Appl. No. 09/876,645, Advisory Action mailed Jun. 27, 2005", 3 pgs.

"U.S. Appl. No. 09/876,645, Advisory Action mailed Sep. 20, 2007", 3 pgs.

"U.S. Appl. No. 09/876,645, Advisory Action mailed Nov. 22, 2006", 3 pgs.

"U.S. Appl. No. 09/876,645, Preliminary Amendment filed Oct. 18, 2001", 4 pgs.

"U.S. Appl. No. 09/876,673 Response filed Mar. 24, 2008 to Final Office Action mailed Jan. 23, 2008", 11 pgs.

"U.S. Appl. No. 09/876,673, Advisory Action mailed Dec. 19, 2005", 2 pgs.

"U.S. Appl. No. 09/876,673, Notice of Non-Compliant Amendment mailed Apr. 3, 2006", 2 pgs.

"U.S. Appl. No. 09/876,673, Response filed Jan. 31, 2006 to Advisory Action mailed Dec. 19, 2005 and supplemental to RCE filed Dec. 6, 2005", 13 pgs.

"U.S. Appl. No. 09/876,673, Response filed May 3, 2006 to Notice of Non-Compliant Amendment mailed Apr. 3, 2006", 2 pgs.

"U.S. Appl. No. 09/876,673, Response filed Nov. 12, 2007 to Restriction Requirement mailed Nov. 2, 2007", 5 pgs.

"U.S. Appl. No. 09/876,673, Restriction Requirement mailed Nov. 2, 2007", 6 pgs.

"U.S. Appl. No. 09/876,673 Final Office Action mailed Jan. 23, 2008", 10 Pages.

"U.S. Appl. No. 09/876,673 Notice of Allowance mailed Apr. 9, 2008", NOAR, 10 Pgs.

"U.S. Appl. No. 09/876,645, Non-Final Office Action Mailed Nov. 16, 2007", 14.

"U.S. Appl. No. 09/876,645 Final Office Action mailed Mar. 18, 2008", 11 pgs.

"U.S. Appl. No. 09/876,645 Response filed Aug. 6, 2007 in response to Final Office Action mailed Jun. 5, 2007", 14 pgs.

"U.S. Appl. No. 09/876,645 Final Office Action mailed Mar. 11, 2005", 10 pgs.

"U.S. Appl. No. 09/876,645 Final Office Action mailed Jun. 5, 2007", 11 pgs.

"U.S. Appl. No. 09/876,645 Final Office Action mailed Jul. 12, 2006", 10 pgs.

"U.S. Appl. No. 09/876,645 Non-Final Office Action mailed Jan. 3, 2007", 10 pgs.

"U.S. Appl. No. 09/876,645 Non-Final Office Action mailed Jan. 9, 2006", 9 pgs.

"U.S. Appl. No. 09/876,645 Response filed Apr. 4, 2007 in response to Non-Final Office Action mailed Jan. 3, 2007", 12 pgs.

"U.S. Appl. No. 09/876,645 Response filed Apr. 10, 2006 in response to Non-Final Office Action mailed Jan. 09, 2006", 11 pgs.

"U.S. Appl. No. 09/876,645 Response filed Jun. 13, 2005 in response to Final Office Action mailed Mar. 11, 2005", 14 pgs.

"U.S. Appl. No. 09/876,645 Response filed Oct. 13, 2006 in response to Final Office Action mailed Jul. 12, 2006", 13 pgs.

"U.S. Appl. No. 09/876,645 Response filed Nov. 15, 2004 in response to Non-Final Office Action mailed Aug. 13, 2004", 14 pgs.

"U.S. Appl. No. 09/876,645 Response filed Dec. 7, 2006 in response to Final Office Action mailed Jul. 12, 2006", 14 pgs.

"U.S. Appl. No. 09/876,645 Non-Final Office Action mailed Aug. 13, 2004", 11 pgs.

"U.S. Appl. No. 09/876,645 Response filed Oct. 4, 2007 in response to Final Office Action mailed Jun. 5, 2007", 13 pgs.

"U.S. Appl. No. 09/876,673 Non-Final Office Action mailed Apr. 19, 2007", 10 pgs.

"U.S. Appl. No. 09/876,673 Final Office Action mailed Jun. 6, 2005", 8 pgs.

"U.S. Appl. No. 09/876,673 Non-Final Office Action mailed Aug. 18, 2004", 8 pgs.

"U.S. Appl. No. 09/876,673 Response filed Nov. 7, 2005 in response to Final Office Action mailed Jun. 6, 2005", 10 pgs.

"U.S. Appl. No. 09/876,673 Response filed Feb. 18, 2005 in response to Non-Final Office Action mailed Aug. 18, 2004", 18 pgs.

"U.S. Appl. No. 09/876,673 Response filed Aug. 13, 2007 in response to Non-Final Office Action mailed Apr. 19, 2007", 14 pgs.

Maffeis, S., "Middleware Support for Application-to-Application Wireless Messaging", *WROX Professional Wireless Developers Conferences*, (Jul. 2000), 1-17.

* cited by examiner

APPARATUS AND COMPUTER-READABLE MEDIA FOR RECOVERABLE WORKFLOW

DIVISIONAL APPLICATION

The present application is a divisional of application U.S. Ser. No. 09/876,673, filed on Jun. 7, 2001, now issued as U.S. Pat. No. 7,412,520, which is incorporated herein by reference.

RELATED APPLICATIONS

The present application is related to the following application which is assigned to the same assignee as the present application and which was filed on even date herewith:

Ser. No. 09/876,645, now issued as U.S. Pat. No. 7,454,751, entitled "Fault-Tolerant System and Methods With Trusted Message Acknowledgement".

TECHNICAL FIELD

The present application relates generally to the field of data processing and, more particularly, to improved apparatus and computer-readable media for providing recoverable workflow.

BACKGROUND

In an enterprise or Internet e-commerce environment, an internal business process or business-to-business ("B2B") transaction often involves integration of services that are provided by multiple applications. Some of the service tasks involved in a workflow may require expensive resources. As is typical in a B2B environment, such resources may not always be reliable when provided remotely via the Internet. As a result, often an entire business transaction or B2B transaction is aborted due to the failure of a single task. This results in a costly loss of time and resources.

It is known, regarding complex and expensive computer workflow products, to provide for the insertion of recoverable checkpoints in a business flow to mitigate the impact of a failed step. Thus, a workflow engine in this type of expensive workflow product would restart a failed flow from the last recoverable checkpoint instead of from the beginning of the overall process flow. This "persistent checkpoint" capability is typically built into this type of workflow product; however, this approach significantly increases the complexity of the associated workflow engines. Accordingly, it typically leads to bulky and high-priced software, as well as expensive hardware platforms to run the software. In addition to their cost, these types of products do not usually perform well in certain environments that require a small footprint and lightweight workflow engines, such as in a client-side or browser-based computing model.

For the reasons stated above, and for other reasons stated below which will become apparent to those skilled in the art upon reading and understanding the present specification, there is a significant need in the art for workflow recovery systems and methods that are light-weight, inexpensive, adaptable to a wide range of low-end and medium-end platforms, and capable of handling sophisticated business workflows.

DETAILED DESCRIPTION

In the following detailed description of embodiments of the invention, reference is made to the accompanying drawings which form a part hereof, and in which is shown by way of illustration specific preferred embodiments in which the inventive subject matter may be practiced. These embodiments are described in sufficient detail to enable those skilled in the art to practice the inventive subject matter, and it is to be understood that other embodiments may be utilized and that logical, procedural, mechanical, and electrical changes may be made without departing from the spirit and scope of the present disclosure. The following detailed description is, therefore, not to be taken in a limiting sense, and the scope of the present inventive subject matter is defined only by the appended claims.

The present inventive subject matter provides a workflow recovery capability in relatively low-cost computer systems. The present inventive subject matter provides improved methods for providing recoverable workflow of complex and/or risk-prone workflows in a computer system or computer network. Various embodiments are illustrated and described herein. In addition to the above-mentioned methods, improved computers and computer networks for providing recoverable workflow are described. The improved workflow recovery techniques are inexpensive, lightweight, and scalable to a wide range of low-end and medium-end platforms, and they can significantly increase the commercial value of computer systems in these market segments.

Figure 1:
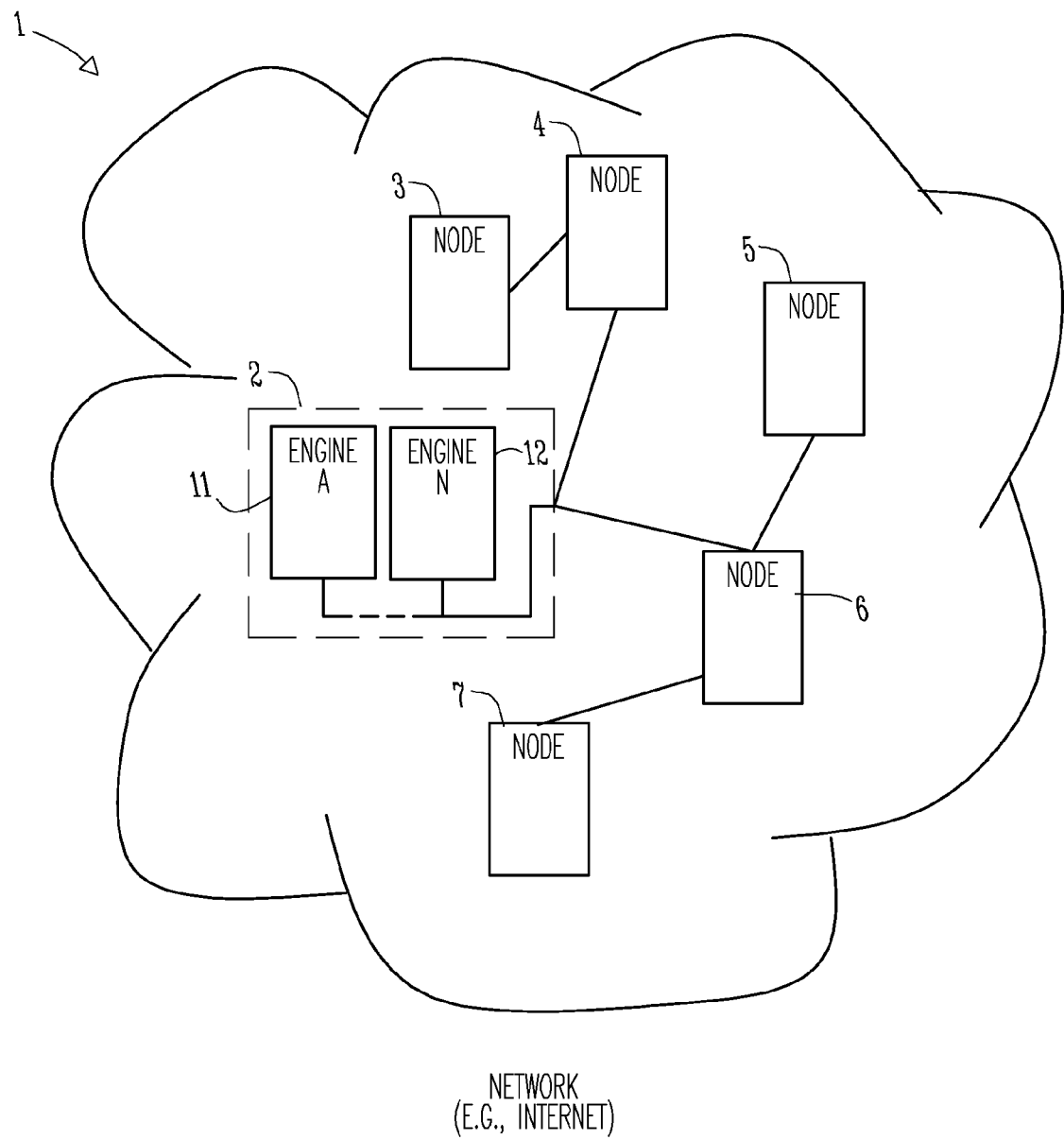
FIG. 1 is a block diagram of a computer network that includes a workflow recovery system, in accordance with one embodiment of the invention.

FIG. 1 is a block diagram of a computer network 1 that includes a workflow recovery system 2, in accordance with one embodiment of the invention. Computer network 1 is merely one example of a system in which a workflow recovery system 2 of the present inventive subject matter can be used. In this example, computer network 1 is the Internet. Although only a small quantity of computer nodes 2-7 is shown, the number of possible active nodes can number in the hundreds of millions. Nodes 2-7 are illustrated as being coupled to form a network. The particular manner in which nodes 2-7 are coupled is not important, and they can be coupled in any desired physical or logical configuration and through any desired type of wireline or wireless interfaces.

Network 1 can be a public or private network. Network 1 can alternatively be small in size, such as a two-computer network within a home, vehicle, or enterprise. As used herein, an "enterprise" means any entity organized for any purpose, such as, without limitation, a business, educational, government, military, entertainment, or religious purpose. Embodiments of the present invention are not limited to multi-computer systems, and they can also be implemented in a single computer system having one or more processors.

Nodes 2-7 can be of any type, including end-user or client computers; network nodes such as switches, routers, hubs, concentrators, gateways, portals, and the like; servers; and other kinds of computers used for any purpose. Moreover, node 2 can function independently of network 1, so it need not necessarily be connected to network 1. For example, node 2 could be coupled to network 1 always, periodically, or never.

In one embodiment, nodes 2-7 can include client computers in a business-to-business (B2B) and/or business-to-consumer (B2C) e-commerce network. B2B and B2C e-commerce networks are increasingly being utilized to enhance communications between enterprises, their customers, their suppliers, as well as with other entities with whom information is desired to be communicated. As a result, enterprises can potentially reduce certain costs of doing business, such as, without limitation, operational costs, sales and marketing costs, advertising costs, inventory costs, shipping costs, labor costs, and accounting costs. In addition, consumers can potentially benefit from B2C e-commerce networks in various ways, such as increased product selection, faster delivery, quality forums, sales alerts, price comparisons, content personalization, and so forth.

As used herein, "workflow" means one or more tasks or processes that together perform a specific function. The processes are generally performed by a computer, but certain processes can be performed by a person. An example of a B2C e-commerce workflow is a consumer logging onto a particular business website to determine the availability and price of an item. An example of a B2B e-commerce workflow is a manufacturer's parts-inventory computer automatically ordering parts from a supplier's parts-stocking computer.

Figure 2:
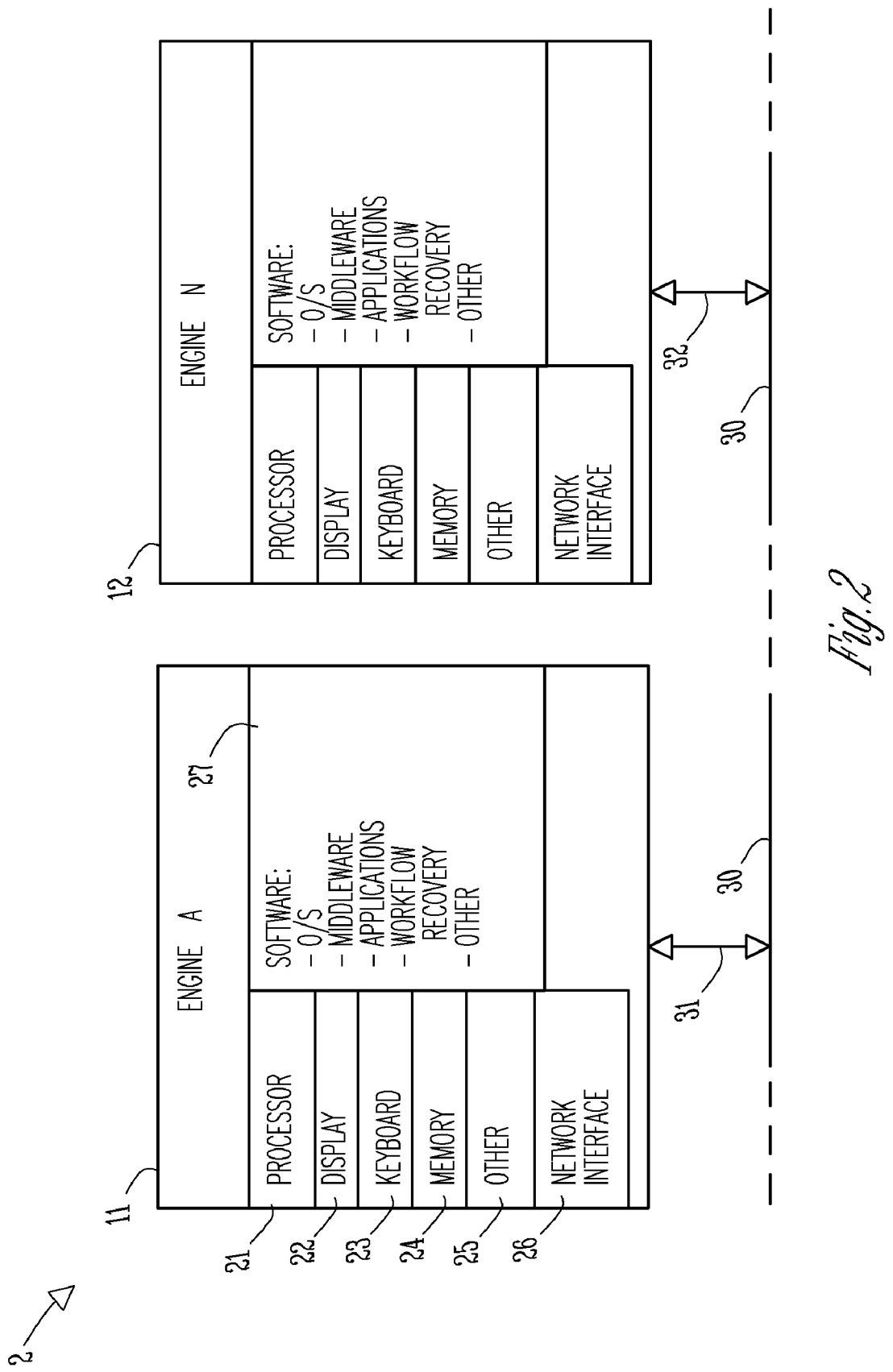
FIG. 2 is a more detailed block diagram of a system to provide workflow recovery, in accordance with one embodiment of the invention.

FIG. 2 is a more detailed block diagram of a system 2 to provide workflow recovery, in accordance with one embodiment of the invention. In this embodiment workflow recovery system 2 comprises computers 11 and 12, and in some embodiments workflow recovery system 2 can comprise a large number of computers. In the embodiment illustrated, computer 11 may also be referred to as Engine A, and computer 12 may also be referred to as Engine N. Computers 11 and 12 can be substantially identical, as shown in FIG. 2, or they can alternatively be quite different in physical and functional features, depending upon the requirements of the network of which they form a part. In other embodiments, workflow recovery system includes only one computer, such as computer 11 or computer 12.

Computer 11 comprises, for example, at least one processor 21 that can be of any suitable type. As used herein, "processor" means any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit.

Computer 11 further comprises, for example, suitable user interface equipment such as a display 22, a keyboard 23, a pointing device (not illustrated), voice-recognition device (not illustrated), and/or any other appropriate user interface equipment that permits a system user to input information into and receive information from computer 11.

Computer 11 further comprises memory 24 that can be implemented in one or more forms, such as a main memory implemented as a random access memory (RAM), read only memory (ROM), one or more hard drives, and/or one or more drives that handle removable media such as compact disks (CDs), diskettes, magnetic tape cartridges, and other types of data storage.

Computer 11 further comprises a network interface element 26 to couple computer 11 to network bus 30 via network interface bus 31. Network bus 30 provides communications links among the various components of a workflow recovery system 2, as well as optionally to other nodes of a more comprehensive network, if desired, and it can be implemented as a single bus, as a combination of busses, or in any other suitable manner. Computer 12 is coupled to network bus 30 via network interface bus 32, which can be equivalent to network interface bus 31.

Computer 11 can also include other hardware elements 25, depending upon the operational requirements of computer 11. Hardware elements 25 could include any type of hardware, such as modems, printers, loudspeakers, scanners, plotters, and so forth.

Computer 11 further comprises a plurality of types of software programs, such as operating system (O/S) software, middleware, application software, workflow recovery software, and any other types of software as required to perform the operational requirements of computer 11. The middleware, application software, and workflow recovery software will be discussed in greater detail below.

Figure 3:
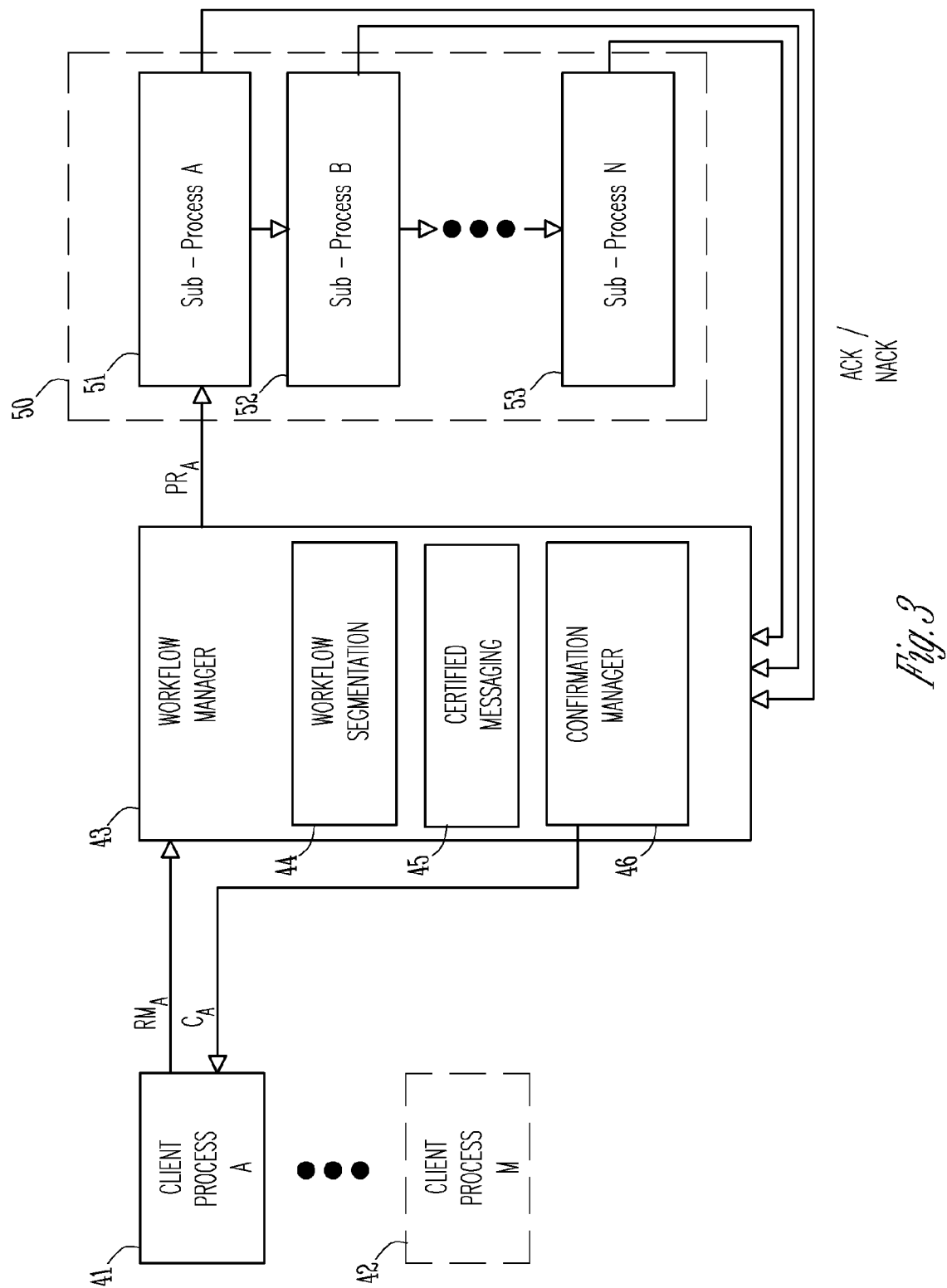
FIG. 3 is a block diagram illustrating a workflow recovery mechanism within a computer system comprising a number (M) of client processes and a number (N) of segmented sub-processes of a workflow, in accordance with one embodiment of the invention.

FIG. 3 is a block diagram illustrating a workflow recovery mechanism within a computer system comprising a number (M) of client processes 41-42 and a number (N) of segmented sub-processes 51-53 of a workflow 50, in accordance with one embodiment of the invention.

Client processes 41-42 may also be referred to herein as client processes A through M, respectively. Client processes 41-42 can reside on one or more of nodes 2-7 (FIG. 1).

Workflow manager 43 can be provided within any suitable hierarchical or organizational level of software 27 (FIG. 2). In one embodiment, workflow manager 43 is implemented as a combination of middleware and specific workflow segmentation software; however, other implementations are possible. For example, workflow manager 43 could be implemented within an application, within the middleware, or within a combination of the application and middleware software. Workflow manager 43 comprises a workflow segmentation function 44, a certified messaging function 45, and a confirmation manager 46.

In one embodiment, certified messaging function 45 forms part of a commercially available middleware program. While any of various commercially available middleware programs could be used, one embodiment of the invention uses TIB™ available from TIBCO Software Inc., Palo Alto, Calif., U.S.A. whose URL is currently tibco-com (to avoid inadvertent hyperlinks the period in the preceding URL has been replaced by a hyphen). Other commercially available middleware programs that can be used include MQ Series™ from IBM Corporation, Armonk, N.Y., U.S.A., Microsoft MessageQueue™ (MSMQ) from Microsoft Corporation, Redmond, Wash., U.S.A., and DEC MessageQueue™ from Digital Equipment Corporation, Maynard, Mass., U.S.A.

As used herein, "certified messaging" means that messages are guaranteed to be delivered even if the sender, receiver, and/or network are not functioning concurrently with the message delivery event. A "certified message publisher" means a computer process that sends out certified messages to a computer network to which it is coupled. A "certified message receiver" (also called a "certified message listener") means a computer process that receives certified messages. When a certified message is sent by a certified message publisher, a persistent record is maintained until an acknowledgement message is received back from the certified message receiver, usually automatically and immediately upon receiving the message.

Workflow 50 represents one or more processing operations that a client process, such as client process A, desires to have performed. Workflow 50 comprises sub-processes 51-53, which may also be referred to herein as sub-processes A through N, respectively. Sub-processes 51-53 can reside on one or more of nodes 2-7 (FIG. 1), or they can all reside on one node, although system reliability may not be optimal in the latter case. Note that although they are depicted in FIG. 3 in a relatively simplistic manner, the sub-processes 51-53 do not need to be executed in linear order. Completion of a sub-process can trigger the start of any other sub-process, based on a specific workflow model and the execution status of the current sub-process.

When one or more client processes, such as client process A and/or client process M, requests that workflow 50 be performed, it sends a request message, such as $RM_A$ generated by client process A, to workflow manager 43. Request message $RM_A$ can be a certified message.

Workflow 50 represents a complex workflow comprising a plurality of tasks. Execution of some of the tasks, i.e. a subset of the tasks, may entail a substantial likelihood of failure for any number of reasons. Alternatively, workflow 50 could comprise such a lengthy set of relatively easy tasks that the odds of executing all of them without a hardware or software failure are unacceptably low.

Thus, workflow 50 is segmented into two or more segments or sub-processes, such as sub-processes 51-53. This segmentation can be performed, for example, by a human computer user or systems developer. Alternatively, it could be performed by workflow segmentation function 44 in accordance with a suitable algorithm.

Workflow 50 is segmented or grouped into sub-processes according to one or more desired criteria, which can include any number of different factors. Each sub-process can comprise one or more tasks. One factor in determining the segmentation of workflow 50 could be, for example, the probability of a successful completion of one or more tasks on behalf of the requesting client process. For example, if a particular sequence of tasks has a relatively low likelihood of a successful completion, it can be broken into two or more segments (whether by a human developer or by an algorithm performed, for example, by workflow segmentation function 44), each of which segments has a relatively high probability of a successful completion.

Other factors upon which workflow segmentation decisions can be made can include relative processing complexity, physical or geographical distance between nodes, time-dependent load factors (e.g. lower probability of success during a particular period in the hour, day, week, month, year, etc.), historical availability records (including regional power outages, for example, or availability of particular nodes), the identity of the originating client, the type of client-originating request, the result(s) returned from previous processing operations, and so forth.

Workflow segmentation function 44 establishes a recoverable checkpoint at the conclusion or end of each workflow sub-process 51-53. Process execution will not proceed past each checkpoint, unless all previous sub-processes have been successfully performed. In one embodiment, recoverable or persistent checkpoints are established using a commercially available middleware program product, such as one of those described earlier. By using commercially available middleware, developers of computer systems and computer networks are able to avoid developing or acquiring complex and expensive code to support a persistent checkpoint function.

Figure 4:
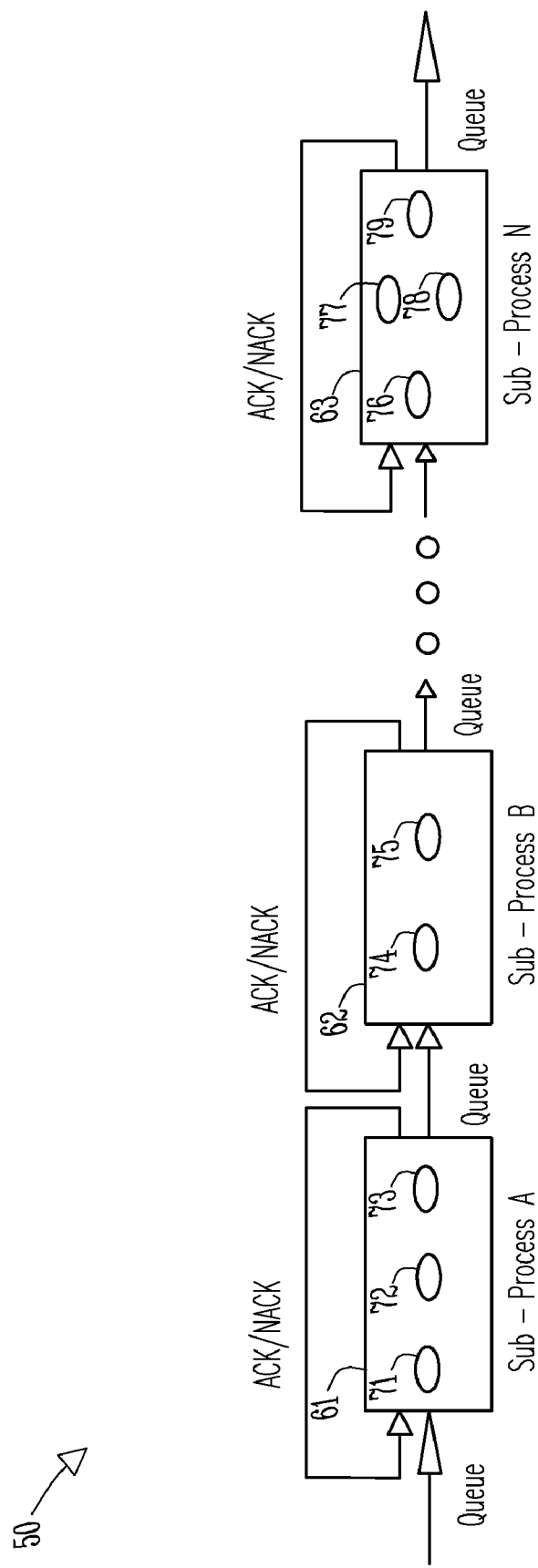
FIG. 4 is a block diagram representation of an example process providing workflow recovery, in accordance with one embodiment of the invention.

While a linear workflow segmentation has been illustrated in FIGS. 3 and 4, in another embodiment the segmentation could be performed in a two-dimensional manner with branching, and a checkpoint could be located, for example, at any of the branches.

The level of sophistication and complexity of workflow segmentation function 44, whether performed by a human computer user or by an algorithm, in performing workflow segmentation can vary from quite basic to very sophisticated. For example, workflow segmentation function 44 could simply segment workflow 50 based upon the time of day, setting more frequent checkpoints for historical peak processing periods, and setting less frequent checkpoints for historical off-peak processing periods.

In an alternative embodiment, workflow segmentation function 44 could segment workflow 50 dynamically, utilizing an algorithm employing any number of desired input variables, such as any or all of those mentioned earlier.

In operation, after workflow 50 has been segmented, workflow manager 43 sends a processing request ($PR_A$) to sub-process A, in response to a request by a client process, such as client process 41, to perform a processing function. Processing request message $PR_A$ can be a certified message.

Workflow manager 43 uses certified messaging function 45 to monitor the status of processing at each checkpoint. If confirmation manager 46 of workflow manager 43 receives an acknowledgement ("ACK") message from a sub-process, such as sub-process 51, confirmation manager 46 indicates successful completion of sub-process 51. This status can be recorded within workflow manager 43. In addition, or alternatively, it can be sent to the requesting process, such as client process 41. A completion message $C_A$ can be sent from confirmation manager 46 to client process 41 after successful completion of processing of each individual sub-process 51-53, or alternatively only upon successful completion of the entire workflow 50. Completion message $C_A$ can be a certified message.

However, as an alternative to a successful completion of sub-process 51, either of two failure modes (both designated "NACK") could also have resulted. A first failure mode could result if an invalid result were returned from sub-process 51 to confirmation manager 46. An example of this would be a purchase request in an amount exceeding the purchaser's credit limit. A second failure mode could result if no result were returned from sub-process 51 to confirmation manager 46. An example of this would be if the process timed-out before returning a result.

A timer mechanisms can be triggered to count down once a sub-process is given a processing request to handle. Timer mechanisms can vary from a simple clock that always counts the same time period, to a sophisticated timing element that alters the countdown period depending upon any number of variables, such as the nature of the task, the workflow engine performing the task, and so forth. The ACK and NACK messages can be certified messages.

If sub-process 51 generates a successful result, but a failure occurs in a subsequent sub-process, such as sub-process 52 or sub-process 53, it is unnecessary to perform sub-process 51 all over again, because the performance of workflow 50 can be recovered at least through the successfully completed sub-process 51. Workflow manager 43 and/or the originating client process keep track of the progress of workflow 50, based upon ACK and/or NACK messages received by confirmation manager 46 and processed by certified messaging function 45.

It will be seen that recoverable workflow is provided by the workflow recovery mechanism illustrated in FIG. 3, because in the event that a software or hardware failure occurs in workflow 50, or if for any reason messages $RM_A$ or $PR_A$ are not delivered, workflow manager 43 and/or the requesting client process 41-42 will eventually realize this fact, and workflow 50 will resume after the last successfully passed checkpoint, without having to revert to the beginning of workflow 50 (unless sub-process 51 failed).

In an alternate embodiment, the function of confirmation manager 46 can be performed within one or more of sub-processes 51-53 by providing such one or more sub-processes 51-53 with a resource that generates a respective ACK or NACK signal to the requesting client when the corresponding sub-process 51-53 has successfully or unsuccessfully concluded. For the purposes of implementing the persistent message queuing function of the inventive subject matter, it is immaterial where such function is performed, e.g. within the sub-processes 51-53, within the workflow manager 43, or elsewhere.

FIG. 4 is a block diagram representation of an example workflow 50 providing workflow recovery, in accordance with one embodiment of the invention. Workflow 50 comprises one or more tasks 71-79. Prior to execution of workflow 50, workflow segmentation function 44 (FIG. 3) of workflow manager 43 segments workflow 50 into one or more recoverable sub-processes, such as sub-processes 61-63 (also referred to herein as sub-processes A-N). Sub-processes A-N can reside on one machine or on multiple machines.

Each sub-process A-N can comprise one or more of tasks 71-79. Tasks 71-79 can represent any type of computer-executable task. Tasks 71-79 can also include tasks performed by other machines, by humans, or by other entities. Tasks 71-79 can be performed by one or more application service providers. In the embodiment shown in FIG. 4, sub-process A includes tasks 71-73; sub-process B includes tasks 74 and 75; and sub-process N includes tasks 76-79.

Also illustrated in FIG. 4 are "queue" functions before sub-process A, between sub-processes A and B, between sub-processes B and N, and after sub-process N. This function represents a persistent message queuing function performed by certified messaging function 45 of workflow manager 43. As explained earlier, the persistent message queuing function repeatedly delivers a message until the persistent message queuing function receives an ACK or NACK message.

In one embodiment, each sub-process A-N is triggered by its reception of an invocation request message ("IRM", not illustrated). An IRM can be generated by workflow manager 43. An IRM can be accompanied by various parameters and/or data, such as initialization data, and data to be processed, including results generated from previously executed sub-processes. These parameters can include any information that would be useful or necessary to continue the transaction, such as who initiated the transaction, who is the client, what kind of request was initiated, what are the return results from previous steps or tasks, or any other information that could be needed to restart the workflow from that point forward.

The IRM is persistently sent by workflow manager 43 until it receives a positive ACK from the corresponding sub-process. Each successfully executing sub-process sends one or more IRM's to its successive sub-process.

An exception condition (e.g. a NACK indicating no result or an incorrect result) results in workflow manager 43 resending an IRM to the sub-process that returned the NACK. If the system has hardware redundancy, the workflow manager 43 could request execution of the sub-process on a different workflow engine at this point. This assumes that the different workflow engine includes an instance of the appropriate resources, such as application software module(s), necessary to execute the workflow assigned to be performed by it.

Each sub-process A-N is recoverable. The certified messaging function 45, as represented by the "queue" elements in FIG. 4, provides persistent checkpoints. Whenever there is a failure within a sub-process A-N, only that particular sub-process needs to be retried. All process operations and state information generated in previous sub-processes is preserved, and they are guaranteed not to be repeated.

In one embodiment, the persistent checkpoint can be implemented in part through the certified messaging capability of commercially available middleware. This allows the use of low and medium-end commercial workflow engines to handle sophisticated workflow problems that require partial recoverability. Such workflow engines can be built, for example, on top of commercially available interpretation engines that support middleware messaging. Examples include Visual Basic Scripting™ in the Microsoft Visual Basic™ product, available from Microsoft Corporation, Redmond, Wash., U.S.A; Java Scripting™ in the Java Virtual Machine™ product, available from multiple vendors including Sun Microsystems Inc., Palo Alto, Calif., U.S.A.; and TIB/MessageBroker™ available from TIBCO Software Inc., Palo Alto, Calif., U.S.A.

By implementing the persistent checkpoint function through middleware, the persistent checkpoint function is separated from the core process flow engine, helping to minimize the complexity of the core process flow engine. Thus, low and medium-end commercial workflow engines, like those mentioned above, can be used by developers for handling sophisticated and complex business workflows that require partial recoverability. Alternatively, developers can themselves develop such workflow engines, which can be kept relatively simple, because they do not need to contain complex code that is normally associated with implementing the persistent checkpoint function.

Figure 5:
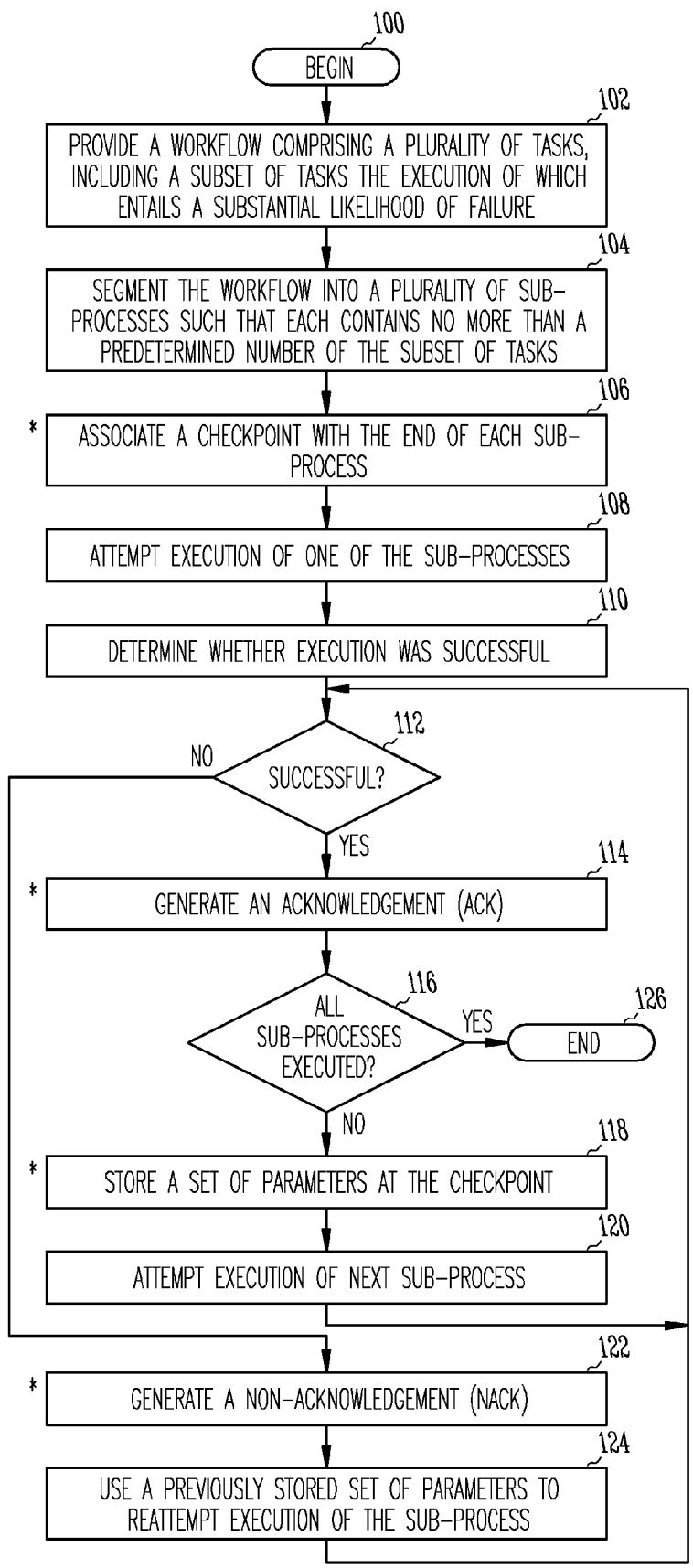
FIG. 5 is a flow diagram illustrating a method of providing workflow recovery in a computer system, in a computer network, or in a processor operating under control of computer instructions residing on a non-transitory computer-readable medium, in accordance with various embodiments of the invention.

FIG. 5 is a flow diagram illustrating a method of providing workflow recovery in a computer system, in a computer network, or in a processor operating under control of computer instructions residing on a non-transitory computer-readable medium, in accordance with various embodiments of the invention. The method begins at 100.

In 102, a workflow is provided that comprises a plurality of tasks. The tasks include a subset whose execution entails a substantial likelihood of failure.

In 104, the workflow is segmented into a plurality of sub-processes, such that each sub-process contains no more than a predetermined number of the subset of tasks. The predetermined number can be as low as one task, e.g. if that task has been determined to entail a very high likelihood of failure.

In 106, a checkpoint is associated with the end of each sub-process. This operation can be performed using commercially available middleware.

In 108, execution is attempted of one of the sub-processes.

In 110 and 112, a determination is made whether execution of the one sub-process was successful. If so, the method goes to 114; otherwise, it goes to 122.

In 114, an acknowledgement (ACK) is generated. This operation can be performed using commercially available middleware.

In 116, a determination is made whether all sub-processes have been executed. If so, the method ends at 126; otherwise, it goes to 118.

In 118, a set of parameters is stored at the checkpoint associated with the completion of the successfully executed sub-process. This operation can be performed using commercially available middleware.

In 120, execution is attempted of the next sub-process.

In 122, a non-acknowledgement (NACK) is generated. This operation can be performed using commercially available middleware.

In 124, a previously stored set of parameters is used to reattempt to execute the sub-process, and the method goes to 112.

It should be understood that the operations shown in FIG. 5 are merely representative and not exclusive, and that many other different alternative operations could be implemented using the concepts taught by the present disclosure.

The operations described above with respect to the method illustrated in FIG. 5 can be performed in a different order from those described herein. Also, it will be understood that although the method is described as having an "end", it typically is continuously performed.

Recoverable workflow, including establishing persistent checkpoints, utilizing a certified messaging capability, generating ACK and NACK indications, and storing parameters at checkpoints, is carried out by suitable instructions in one or more computer programs that are stored in and executed by one or more computers 11-12 in FIG. 2. One of ordinary skill in the art is capable of writing suitable instructions to implement a recoverable workflow capability. An example pseudocode implementation is provided in Appendix A Embodiments of the present invention provide for recoverable workflow computer systems and associated methods. Various embodiments have been illustrated and described herein. According to one embodiment, complex and/or risk-prone workflows in a computer system or computer network are segmented into sub-processes. A checkpoint is established at the end of each sub-process. During workflow execution, a determination is made whether processing of each sub-process was successful. If so, a set of parameters is stored at each checkpoint before processing the next sub-process, but otherwise processing of the failed sub-process is retried, using the parameter set stored at the previous checkpoint. The methods use a certified messaging capability that guarantees delivery of any message. In the event a hardware or software failure occurs during a sub-process execution, the certified messaging capability returns a failure indication, so that execution of the failed sub-process can be reinitiated.

Improved computers and computer networks for providing recoverable workflow have been described. In addition, a recoverable workflow computer system and a computer-readable medium comprising computer instructions for providing workflow recovery have also been described. The improved workflow recovery techniques are inexpensive, lightweight, and scalable, and they can significantly increase the commercial value of computer systems in the low-cost to medium-cost market segments.

Other embodiments will be readily apparent to those of ordinary skill in the art. The elements, architecture, and sequence of operations can all be varied to suit particular workflow recovery requirements.

The various elements depicted in the drawings are merely representational and are not drawn to scale. Certain proportions thereof may be exaggerated, while others may be minimized. The drawings are intended to illustrate various implementations of the inventive subject matter, which can be understood and appropriately carried out by those of ordinary skill in the art.

Although specific embodiments have been illustrated and described herein, it will be appreciated by those of ordinary skill in the art that any arrangement or process that is calculated to achieve the same purpose may be substituted for the specific embodiment shown. This application is intended to cover any adaptations or variations of the present inventive subject matter. Therefore, it is manifestly intended that embodiments of this inventive subject matter be limited only by the claims and the equivalents thereof.

What is claimed is:

1. A computer for use in a computer network comprising a plurality of workflow engines and at least one workflow comprising a plurality of tasks, the computer executing a computer program comprising the operations of:
   segmenting the plurality of tasks into a plurality of sub-processes each having an associated checkpoint, wherein the at least one workflow is segmented based upon an historical availability record of at least one workflow engine;
   requesting execution of the at least one workflow on behalf of a client;
   attempting execution of one of the sub-processes on the at least one workflow engine;
   determining, by a certified messaging capability, whether execution was successful; and
   if successful, storing a set of parameters at the associated checkpoint;
   otherwise, using a previously stored set of parameters to reattempt execution of the sub-process on a second workflow engine, and the certified messaging capability generating a non-acknowledgement.

2. The computer recited in claim 1, wherein the certified message capability is provided by a commercially available middleware product.

3. The computer recited in claim 1, wherein the computer program further comprises:
   the certified messaging capability generating an acknowledgement if execution of the sub-process is successful.

4. A non-transitory computer-readable medium containing computer instructions for instructing a processor, the processor being for use in a computer network comprising at least one workflow comprising a plurality of tasks, wherein the instructions comprise:
   segmenting the at least one workflow into a plurality of sub-processes each having an associated checkpoint, wherein the at least one workflow is segmented based upon a combination of relative processing complexity of ones of the plurality of tasks and an identity of a client requesting execution of the at least one workflow;
   requesting execution of the at least one workflow on behalf of the client;
   attempting execution of one of the sub-processes;
   determining, by a certified messaging capability, whether execution was successful; and
   if successful, storing a set of parameters at the associated checkpoint;
   otherwise, using a previously stored set of parameters to reattempt execution of the sub-process, and the certified messaging capability generating a non-acknowledgement.

5. The computer-readable medium recited in claim 4, wherein the certified message capability is provided by a commercially available middleware product.

6. The computer-readable medium recited in claim 4, wherein the computer instructions further comprise:
   the certified messaging capability generating an acknowledgement if execution of the sub-process is successful.

7. A computer for use in a computer network comprising a plurality of workflow engines and at least one workflow comprising a plurality of tasks, the computer executing a computer program comprising the operations of:

segmenting the at least one workflow into a plurality of sub-processes each having an associated checkpoint, wherein the at least one workflow is segmented based upon geographical distance between workflow engines;

requesting execution of the at least one workflow on behalf of a client;

attempting execution of one of the sub-processes;

determining, by a certified messaging capability, whether execution was successful; and if successful, storing a set of parameters at the associated checkpoint;

otherwise, using a previously stored set of parameters to reattempt execution of the sub-process, and the certified messaging capability generating a non-acknowledgement.

8. The computer recited in claim 7, wherein the certified message capability is provided by a commercially available middleware product.

9. The computer recited in claim 7, wherein the computer program further comprises:

the certified messaging capability generating an acknowledgement if execution of the sub-process is successful.

* * * * *